Aug. 24, 1965     A. ELMENDORF     3,202,743

METHOD OF FORMING A COMPOSITE PANEL

Filed Sept. 6, 1961     3 Sheets-Sheet 1

INVENTOR.
Armin Elmendorf,
BY Parker & Carter
Attorneys.

Aug. 24, 1965　　　A. ELMENDORF　　　3,202,743
METHOD OF FORMING A COMPOSITE PANEL
Filed Sept. 6, 1961　　　3 Sheets-Sheet 2
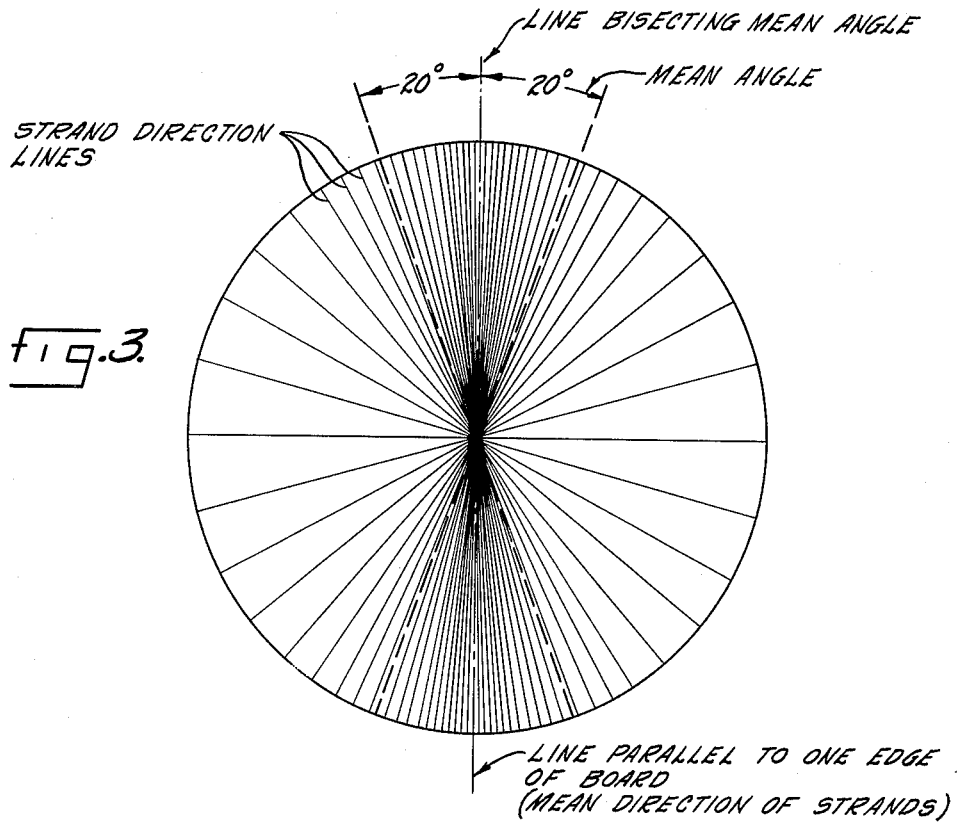
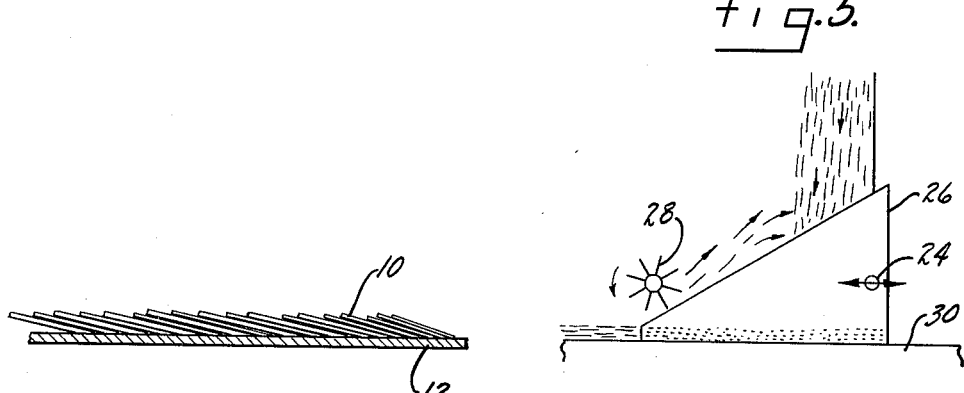
INVENTOR.
Armin Elmendorf,
BY Parker & Carter
Attorneys.

Aug. 24, 1965                A. ELMENDORF                3,202,743
                    METHOD OF FORMING A COMPOSITE PANEL
Filed Sept. 6, 1961                                3 Sheets-Sheet 3
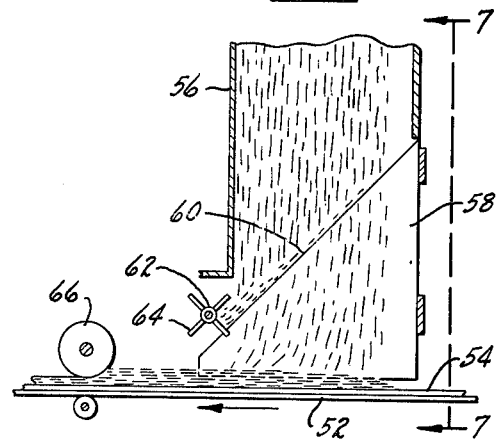
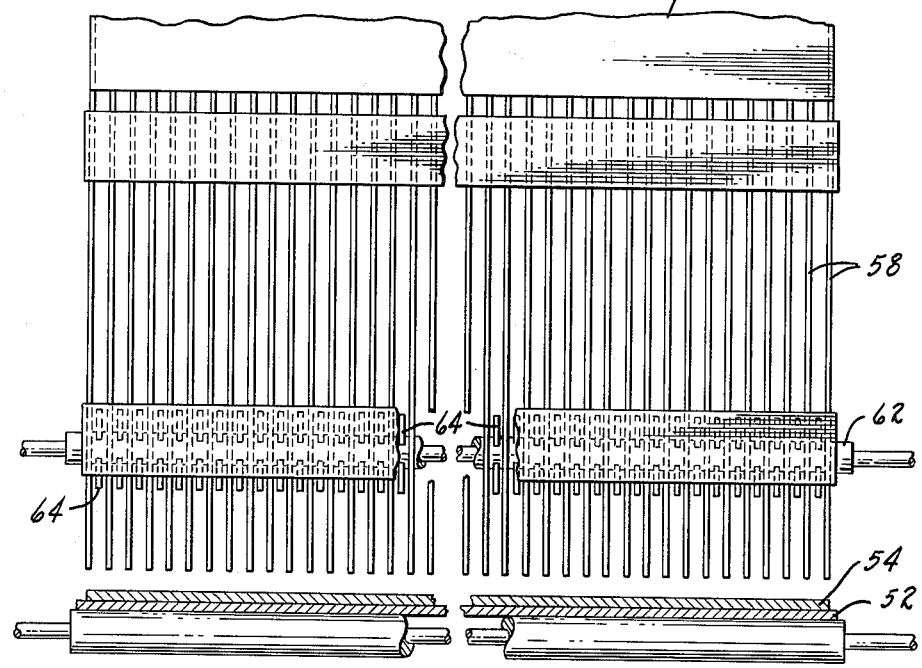
INVENTOR.
Armin Elmendorf,
BY Parker & Carter.
Attorneys.

United States Patent Office 3,202,743
Patented Aug. 24, 1965

3,202,743
METHOD OF FORMING A COMPOSITE PANEL
Armin Elmendorf, Palo Alto, Calif.
Filed Sept. 6, 1961, Ser. No. 136,223
2 Claims. (Cl. 264—109)

This application is a continuation-in-part of my co-pending applications Serial Nos. 687,914, filed October 3, 1957, now abandoned; 741,521, filed June 12, 1958, now Patent No. 2,913,689, and 24,809, filed April 26, 1960, now abandoned, which in turn was a continuation-in-part of my copending application Serial Number 710,658, filed January 23, 1958, now Patent No. 2,913,689.

This invention is directed to a method of making a new and improved composite wood panel or lamina which is comparable with plywood in its major strength property.

None of the particle or shaving boards heretofore known are remotely comparable with plywood in strength. A principal object of this invention is a method of producing a composite wood panel comparable to Douglas fir plywood in its strength properties, and which can be used for the structural uses of Douglas fir plywood, such as sub-flooring and roof sheathing.

The present invention utilizes wood waste developed in plywood and lumber manufacture as well as low-grade logs not suitable for face veneers in plywood. Moreover, it makes possible the utilization of almost the entire log whereas the yield in plywood manufacture is only about 50 percent. The panel of the present invention therefore achieves great savings in raw materials.

Each of the above-mentioned co-pending applications is directed to a panel or lamina or board which is formed of wood strands, as described herein, and a suitable binder, for example, a resin or a cement binder. The present invention, which is a continuation-in-part of all of these co-pending applications, relates to a method of forming these panels or of depositing the strands in such a way as to form a lamina suitable for use in a panel which is satisfactory for the structural uses of Douglas fir plywood.

Other purposes will appear in the ensuing specification, drawings and claims.

Figure 1:
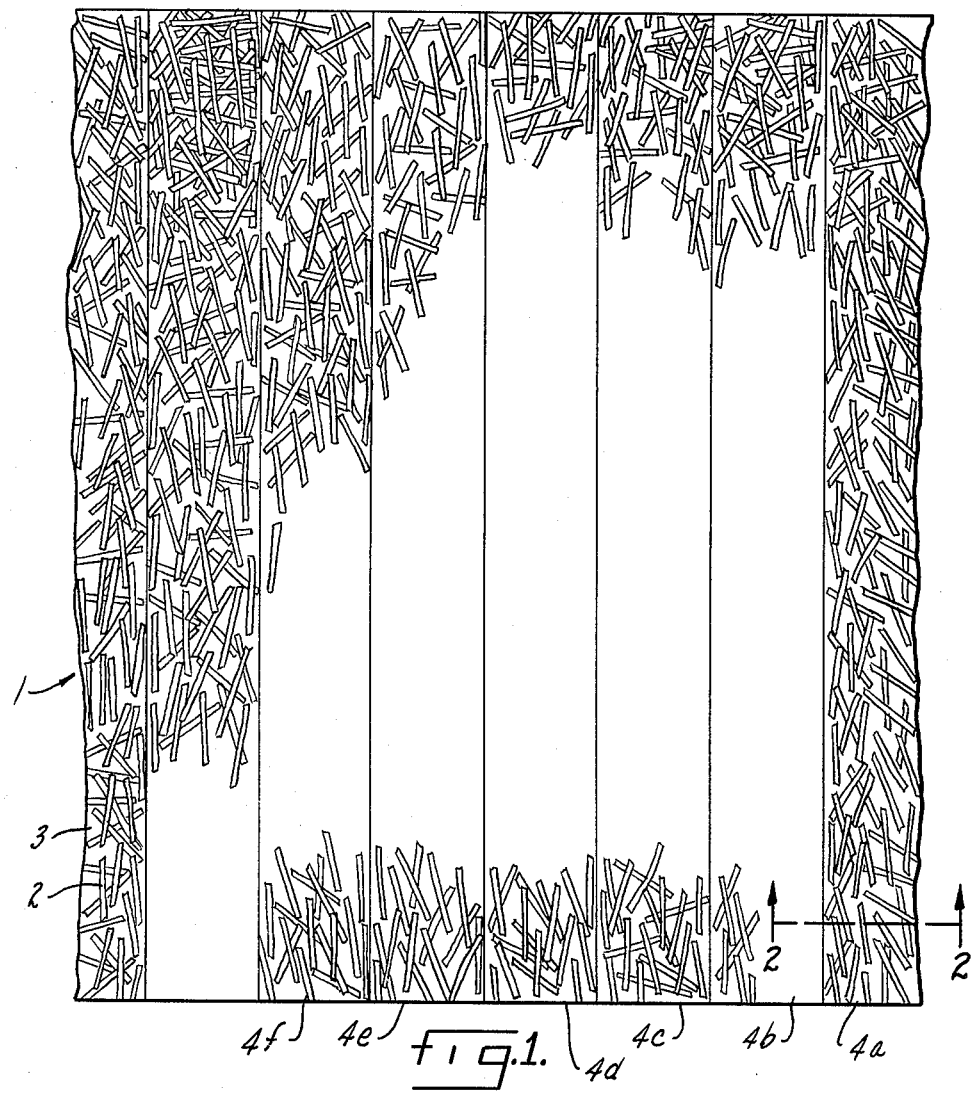
Figure 2:

The invention is illustrated diagrammatically in the following drawings wherein:

FIGURE 1 is a top plan view of a panel formed in accordance with the method disclosed herein, FIGURE 2 is a section along plane 2—2 of FIGURE 1, FIGURE 3 is a diagram illustrating the concept of parallel strand orientation, FIGURE 4 is a side view of a strand mat prior to compressing, FIGURE 5 is a diagrammatic showing of an apparatus for practicing the method disclosed, and FIGURE 6 is a diagrammatic showing of another apparatus for practicing the method disclosed, and FIGURE 7 is a view taken along plane 7—7 of FIGURE 6.

I may utilize the method disclosed herein to make a variety of different panels. For example, co-pending application Serial No. 687,914 illustrates a panel which consists of a single lamina of strands oriented in the manner herein disclosed. The strands may be bound together with a suitable resin or inorganic binder. Co-pending application Serial No. 741,521 illustrates a panel composed of three or more laminae with some or all of the laminae made in the manner disclosed herein. Again, a suitable synthetic resin binder may be used to bind the strands together. Co-pending application Serial No. 24,809 discloses a panel having one or more laminae, preferably three, with the strands of the outer lamina oriented as described, in an inorganic cement binder. All of these products may be formed in accordance with the method disclosed herein.

FIGURES 1 and 2 illustrate a panel formed in accordance with the method disclosed. A panel 1 is formed of strands 2 coated with a binder which may be synthetic resin or adhesive suitable for bonding wood, or the space 3 may be filled with an inorganic cement as described in detail hereinafter. As stated above, the panel may be composed of one or more laminae. The strands in each surface lamina are preferably arranged in generally parallel groups, illustrated at 4a, 4b, 4c, 4d, 4e, 4f, etc.

The panels or boards formed in accordance with the present method may be used as sheathing in walls, floors or roofs, and they may be covered by any suitable outer covering. Thus, wall sheathing may be covered by wood siding, sub-flooring by any suitable floor covering, such as linoleum, and roof sheathing by shingles, rolled roofing, or other roof covering. The panels may be fastened to the framing by means of nails or other suitable fastening means. The framing members are usually 16 inches or 24 inches on center, but may range from 12 inches to 48 inches apart.

In accordance with the present invention, each layer or lamina is composed of a plurality of strands or strand-like shavings, each of which consists of a multiple number of the minute fibers of which wood is composed, the fibers being in the same position with respect to one another that they occupied in the original wood. The strands of the outer lamina are bonded together in a manner which is hereinafter referred to as "parallel orientation." By the term "parallel orientation" I mean that along any line parallel to an edge of the lamina, more than 50 percent of the strands extend in a direction approaching this line, and less than 50 percent approach in their orientation a line which extends across the lamina edge at a right angle. The strands generally have approximately parallel edges, and for proper orientation the average length should be more than three times the width.

I have found by trial that perfect parallelism of all strands is neither practical of achievement nor desirable from the point of view of appearance. Perfect parallelism substantially reduces the strength of the panel across the strands. Crossing of strands at a small acute angle gives the product a woven fabric-like character, but the average acute angle between crossing strands should be less than about 40 degrees. The condition described is illustrated in FIGURE 3.

If we select any point on the surface of a panel in which the strands are all randomly distributed and there measure the acute angle each strand makes with a line which is parallel to one edge of the lamina, and then take the mean of these angles, the mean angle will be approximately 45 degrees.

An idealized illustration of the strand placement for parallel orientation as here defined is shown in FIGURE 3 in which each line represents the direction of a strand. The heavy dotted lines define the position of the legs of the maximum mean acute angle made by the crossing strands. The vertical line bisecting this angle is parallel to one edge of the lamina. The maximum mean angle does not exceed about 40 degrees. In other words, at any point in the lamina the mean angle between the strands in ideal random orientation would be 90 degrees, whereas in parallel orientation as here defined, it would be less than about 40 degrees.

Each of the strands utilized in the laminae has a length which is several times its width. The ratio of length to width may be as low as 3 to 1, but it is preferably higher than 8 to 1. A practical average width of the strands is $\tfrac{1}{32}$ of an inch to $\tfrac{1}{4}$ of an inch. The thickness of the strands when cut from wood blocks should be on the order of .005 to .020 inch. In any given batch of strands some variation from these ranges may be found in individual strands, but the average width and thickness should be in the range specified. It is important that the fibers in the strands be approximately parallel to the surface of the strands. Waste veneers may be employed for production of the strands, in which case the edges of the strands may be parallel, and the width of the strands is about the same as the thickness of the veneer.

Synthetic resin binders may account for about 2 percent to 15 percent of the weight of the lamina. For best results any fines that may be present should be screened out before the binder is added, as the fines are generally short and require more resin to obtain the same strength and they do not lend themselves to parallel orientation. The broken particles that pass through a 10 mesh screen are generally too fine to be useful. It should be understood, however, that in some cases it may be desirable to separately deposit a thin layer of fine coated particles on the surface of the outer laminae, or a layer of paper may be used in order to obtain a pit free smooth surface.

When the binder is to be of the inorganic type, the strands may be embedded in a matrix of the cement. The ratio of weight on the dry basis of the strands in the board to the weight of cement may vary from about 1 to 2 up to about 1 to 10. Sawing of the product is facilitated by using a lesser amount of the binder, while the strength of the product is enhanced by utilizing an increased amount of the binder up to the aforementioned ratio of about 1 to 10. Portland cement is preferred as the matrix material where weather resistance is important.

The important feature in each of the methods disclosed is to deposit the strands on a caul or on a previously deposited layer of strands such that the strands in the layer are in generally parallel groups and in each group they are deposited in overlapping arrangement resembling fish scales. The strands in each group are oriented into parallelism as described above. When a single lamina is to be formed, the strands are deposited in generally parallel groups on a suitable caul. FIGURE 4 shows deposited oriented strands prior to their being compacted. Note that the strands 10 make a small acute angle with the underlying support 12. This angle decreases as the mat thickness is decreased. The binder covering the strands may be any of the binders discussed above. When a multiple lamina panel is to be formed, the strands and binder for the outer laminae are separately deposited, each in generally parallel groups.

Orientation is achieved by positioning the strands in groups on the cauls with the groups extending in the direction of movement of the caul, using a device such as shown in FIGURE 5. In this device the coated strands fall on the edges of a bank of fins or plates that are vibrated at high speed and small amplitude in the direction of their length, by any suitable mechanism indicated diagrammatically at 24. One of the plates is indicated at 26. Strands that do not fall into the channels between the fins slide down the fin edges until they are met by a rotating pin 28 which throws them back up again. This may be repeated for each strand until it falls down into a channel and is deposited on the moving caul, or on other strands previously deposited on the moving caul. The strands falling into the pockets or channels are on the whole substantially longer than the spacing of the fins so that they cannot fall at right angles to the fins and must fall onto the receiving caul 30 in substantially parallel positions as here defined. The caul 30 moves beneath the fins so that a continuous deposit of strands will form a mat on the caul, and the strands are deposited in overlapping positions resembling fish scales as shown in FIGURE 4.

The strands are deposited on the caul plates in parallel groups determined by the spacing of the fins. The average length of the strands exceeds the fin spacing, hence the orientation of the strands in each group into substantial parallelism. The top lamina of a three-ply board is deposited on the core layer, and with the strands oriented into parallelism.

FIGURE 6 illustrates another apparatus for carrying out the process of the present invention. In FIGURE 6, the conveying belt is indicated at 52. It is adapted to move a caul 54 or a caul and a layer of previously deposited strands. 56 represents a hopper which has a series of plates 58 extending side by side and parallel to the direction of movement of the conveyor. The plates, as is illustrated in FIGURE 7, are spaced apart by equal distances. The space between adjacent plates is substantially less than the average length of the strands employed although greater than the width of the strands. The upper edge of each of the plates is inclined to the vertical, as indicated at 60. A picker roll 62 has a series of prongs or blades 64 which are adapted to extend between the plates. As binder coated strands fall downwardly through the hopper 56, a certain proportion of the strands will fall through the spaces between the plates. The strands falling through these spaces will extend generally parallel to one another and will have the orientation desired. They are arranged in narrow continuous rows with one row being beneath each space between plates. The strands which are not oriented in a direction parallel to the plates fall across the upper edges of the plates and slide downwardly on the edges to the picker. The picker is continually rotated and the strands that reach the picker blades are thrown back and again fall on the inclined upper edges of the plates. A certain proportion of the strands will reorient themselves and fall through the spaces between the plates. This may be repeated several times for some strands until they all fall through.

As the mat of the binder-coated strands consisting of parallel groups of strands supported on a caul emerges from between the plates, it passes through a compacting stage 66 where it is preferably prepressed to consolidate the mat prior to the placement of other layers of strands. The compacting may also be done after placing the second layer of strands on the first. After the mat has been prepressed, other layers of strands either oriented or otherwise may be placed. The outer or top layer is oriented into parallelism similar to the first layer.

All the structures described will form a strand and binder mat in which the strands of the outer layers or laminae lie much like fish scales. In depositing the strands on the caul, most of the strands fall in a position inclined to the surface of the caul, this angle of inclination relative to the caul being as shown in FIGURE 4. This result is especially conspicuous when the strands are coated with an inorganic binder. When the mat is compacted or compressed, the acute angle between the caul and the strand is reduced.

The strands in each group cross and the average acute angle between crossing strands is less than about 40 degrees. The average acute angle between the crossing strands and a line parallel to one edge of the lamina is less than about 20 degrees.

One example of a product formed in accordance with the present method is a three-lamina panel in which the laminae forming the faces have their strands oriented in directions which are parallel to each other as defined. The core lamina may either have randomly arranged strands or may have strands which are oriented across the direction of the face laminae. In forming such a panel using synthetic resin binder, a pressure is used which will compress the strand mat to a density exceeding that of the wood forming the strands. All woods of commercial importance suitable for the lamina of the present invention have a density below about 0.6. The pressures used are therefore those which will produce a density for the faces ranging from 0.6 to 0.95.

As a specific example, this particular product may be formed with a resin binder, for example phenol-formaldehyde. Using a loosely felted mat having a thickness of about 5½ inches provides a final panel thickness of 0.37 inch. This particular panel, which had a specific gravity or density of 0.78, had a modulus of elasticity of 1,400,000 p.s.i. tested with the oriented direction of face strands across the supports.

In addition to the above three-lamina panel, I may form a panel of a single lamina of oriented strands. This lamina may be formed with a suitable synthetic resin binder or with an inorganic cement binder, and its thickness may be about ⅛ inch or more.

When a panel is made with inorganic cement binders, I may use three or more laminae, with oriented strands in the face lamina and randomly distributed strands for the core, or the strands of the core may be oriented across the direction of the face strands. I may press such a mat with pressures ranging from 100 to 500 lbs. per square inch, and at room temperatures. The pressure used should preferably not crush the wood strands. The pressure is maintained until the cement has set, which may be anywhere from a few minutes for gypsum to 24 hours for some Portland cements.

As a specific example, the following data was obtained from tests made on test specimens cut from commercial-size panels produced on a semi-commercial scale, in which the strands of the face laminae were oriented and positioned in accordance with this invention, using Portland cement as the binder. For the major uses of structural plywood the modulus of elasticity is the most important strength property. The table includes the results of strength tests made on Douglas fir plywood of the 5-ply type, with the face grain lengthwise as well as crosswise of the specimens. The modulus of elasticity measures the stiffness of the panel, or its resistance to bending. Plywood panels used for sub-flooring and for roof sheathing are generally placed with the face grain across the supports, that is, the strong way. The product tested was 3-ply and made with hemlock strands, 2 inches long for the face lamina and ¾-inch ponderosa pine strands for the core. The strands of the face lamina were oriented into parallelism as herein defined and the core strands were randomly distributed. The panel thickness was ½ inch, the density 1.12, and the ratio of cement to strands by weight for both faces and core laminae was 2½ to 1.

|  | Modulus of elasticity, p.s.i. | |
|---|---|---|
|  | Strong way | Weak way |
| ½-inch oriented strand board | 1,100,000 | 310,000 |
| ½-inch 5-ply Douglas fir plywood | 920,000 | 400,000 |

A further form of the invention may include facing layers of oriented strands and a core of lumber. The pressures applied to the mat must not crush the core and will generally be less than 200 p.s.i. A suitable synthetic resin adhesive may be used as the matrix. The panel faces should have a density of between 0.6 and 0.95.

Whereas the preferred form of the invention has been shown and described herein, it should be realized that there are many modifications, substitutions and alterations thereto within the scope of the following claims.

I claim:
1. A method of forming a composite wood panel of wood strands which have a length substantially greater than the width and a matrix of a binder, including the steps of coating the strands with the binder, orienting the binder coated strands into generally parallel groups by passing them through a plurality of parallel zones, said zones separated from one another by walls, the width of said separated zones being substantially smaller than the length of the strands so that said strands which pass therethrough are oriented in the direction of their length, oscillating the separating walls in the direction of the length of the strands to facilitate the passage of the strands through the separated zones, depositing the strands in a loose assemblage in a layer side by side on a support spaced from the bottom of the walls which separate the zones, moving the support in one direction away from the separated zones so that most of the strands, when they fall, make acute angles with the support in a manner resembling fish scales, moving the deposited layers of strands to a pressing means, and pressing the layer of strands and binder to consolidate the layer and to reduce the angles between the strands and the support.

2. A method as in claim 1 further characterized in that the strands which are deposited on the support, which is moving away from the separated zones, form an average angle of less than about 40 degrees when crossing one another.

References Cited by the Examiner

UNITED STATES PATENTS

| 2,186,652 | 1/40 | Orth et al. | 209—97 |
| 2,429,235 | 10/47 | Miskelly et al. | 154—45.9 |
| 2,686,143 | 8/54 | Fahrni | 156—62.8 |
| 2,697,677 | 12/54 | Elmendorf | 161—151 |
| 2,831,793 | 4/58 | Elmendorf | 161—151 |
| 2,853,413 | 9/58 | Christian | 154—45.9 XR |
| 2,854,372 | 9/58 | Yan | 156—26 |
| 2,947,654 | 8/60 | Chapman | 264—109 XR |
| 2,960,423 | 11/60 | Kreibaum | 264—115 XR |
| 2,992,152 | 7/61 | Chapman | 264—113 XR |
| 3,061,878 | 11/62 | Chapman | 264—112 XR |

FOREIGN PATENTS 1,143,353  9/57  France.

ALEXANDER H. BRODMERKEL, *Primary Examiner.*
EARL M. BERGERT, *Examiner.*